INVENTORS:
CHARLES B. VOGEL
DANIEL WEISER
THEIR ATTORNEY

United States Patent Office 2,974,273
Patented Mar. 7, 1961

2,974,273

METHOD AND APPARATUS FOR INVESTIGATING EARTH FORMATIONS

Charles B. Vogel and Daniel Weiser, Houston, Tex., assignors to Shell Oil Company, a corporation of Delaware Filed Jan. 28, 1957, Ser. No. 636,565

4 Claims. (Cl. 324—1)

This invention pertains to the investigation of formations traversed by a borehole and relates, more particularly, to a method and apparatus for investigating the permeability and other properties of such formations.

In drilling operations, the use of a drilling mud comprising finely divided clay or other particles suspended in a fluid normally results in the forming of a mud in a sheath or cake on the face of the permeable formations traversed by the borehole. This mud sheath has a permeability which is essentially a function of the properties of the mud and which is generally much less than that of the formations. Thus, one of the problems to be overcome in measuring the permeability or determining other properties of these formations is the presence of this relatively impermeable mud sheath which unfavorably effects the accuracy of logging instruments or other investigating devices.

Accordingly, while it is a general object of the present invention to provide a new and improved method and apparatus for investigating the properties of formations traversed by a borehole, it is a more particular object to provide such a method and apparatus for investigating the properties of formations having their faces separated from a fluid in a borehole by a relatively impermeable mud sheath. Another object is to provide a new and improved method and apparatus for determining the permeability of such formations. Yet another object is to provide a new method for dispersing a mud sheath from a borehole wall.

These and other objects and advantages of the present invention will be understood from the following description taken with reference to the attached drawings, wherein.

The present invention is based in part on the discovery that the relatively impermeable mud sheath formed on the wall of a borehole can be dispersed when irradiated by sound waves transmitted through fluid in the borehole.

In accordance with the present invention the mud sheath coating the formations forming the borehole wall is dispersed by lowering into the fluid column in the borehole a source of sonic energy which is disposed or oriented to irradiate a portion of the mud sheath. The source is energized and the mud sheath is irradiated to permit the pressure differential between the hydrostatic pressure of the fluid column in the borehole and the formation pressure to force a fluid from within the borehole through the irradiated portion of the mud sheath and into the formation at a rate determined by the permeability of the formation. During this operation measurements of parameters or quantities which are related to the permeability or other properties of the formation and especially those which are effected by the variation in the flow of fluid into the formation are taken from instruments in the borehole or at the surface of the ground.

One quantity which is related to the permeability and composition of a formation is the electric flow potential which appears in the borehole fluid adjacent the irradiated portion of the mud sheath. This potential is believed to develop as a result of two simultaneously operative phenomena which occur in the underlying formation as the result of the migration of fluid from the borehole through the irradiated portion of the mud sheath and into the formation. When a liquid is forced through a porous medium, a difference in potential between two points in the porous medium is created. Thus, fluid filtering through the porous formation exposed in the wall of the borehole creates a detectable E.M.F. Also, a detectable E.M.F. is generated whenever two different electrolytes come into contact in a porous medium, as when a fluid from within the borehole enters the permeable formation and develops contact with the native fluid in the formation. Inasmuch as both E.M.F.'s result from migration of a fluid from the borehole into the formation, and such migration occurs more readily and to a greater extent in highly permeable formations than in those less so, the observed values of the electric flow potentials are a measure of the relative permeabilities of the formations which give rise to them.

Figures 1, 3:
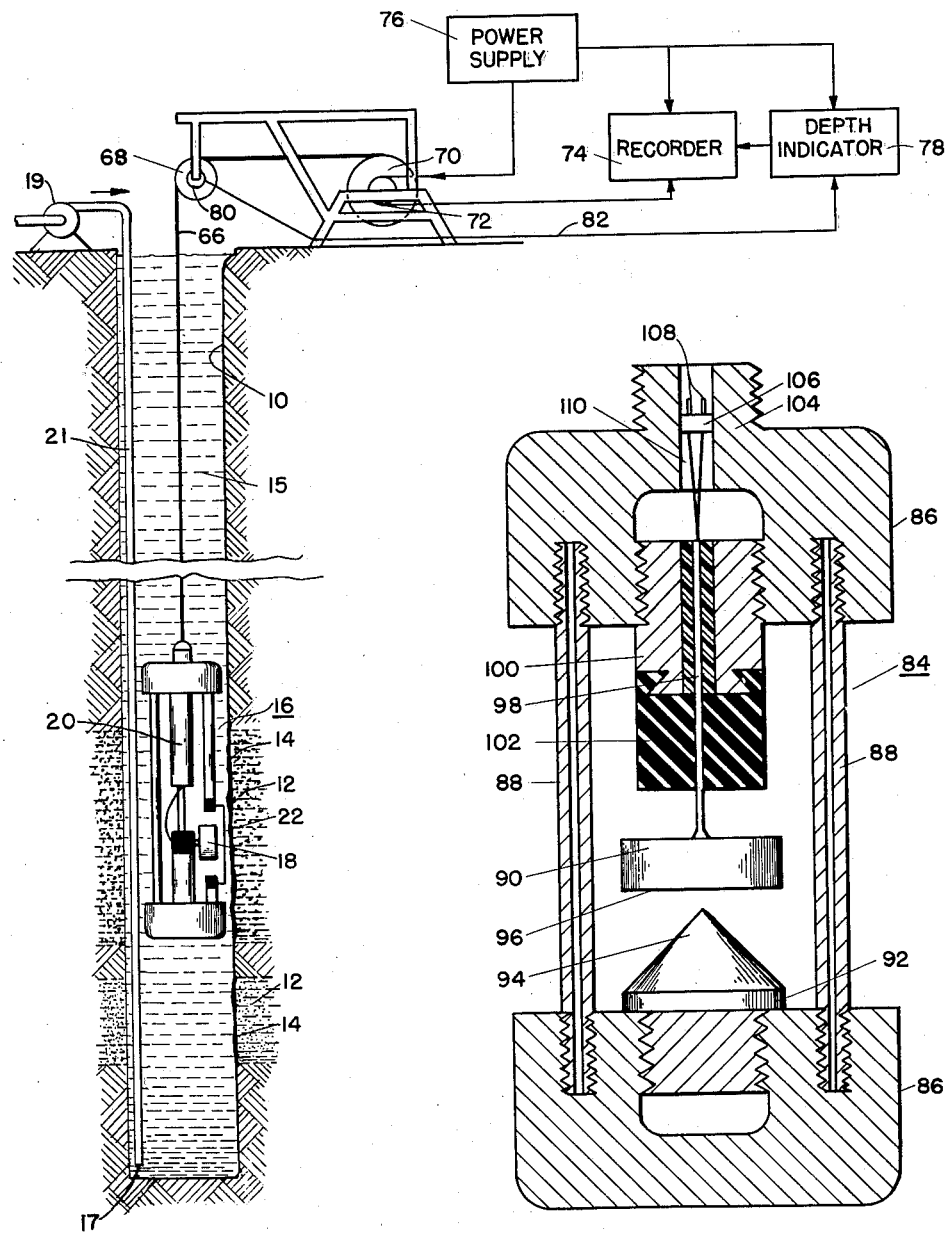
Fig. 1 is a diagrammatic view of one embodiment of the present apparatus showing the underground and surface portions thereof.
Fig. 3 is a diagrammatic view, partially in cross section, of another embodiment of an instrument housing including a source for generating sonic energy for irradiating and dispersing a mud sheath from the wall of a borehole.

Referring now to Fig. 1, there is illustrated a borehole 10 which traverses a number of permeable formations 12, the traversed surfaces or faces of which are sheathed by a substantially impermeable mud cake or sheath 14 which is in contact with a column of fluid 15 in the borehole.

In investigating the permeability of the formations 12, in accordance with the present invention, a logging device is used which in its preferred form embodies a housing 16 including a sonic generator 18; a source of oscillations 20, electrically connected to the generator; and a pair of electric flow potential measuring electrodes including a metallic screen electrode 22 and the housing 16 itself.

Figure 2:
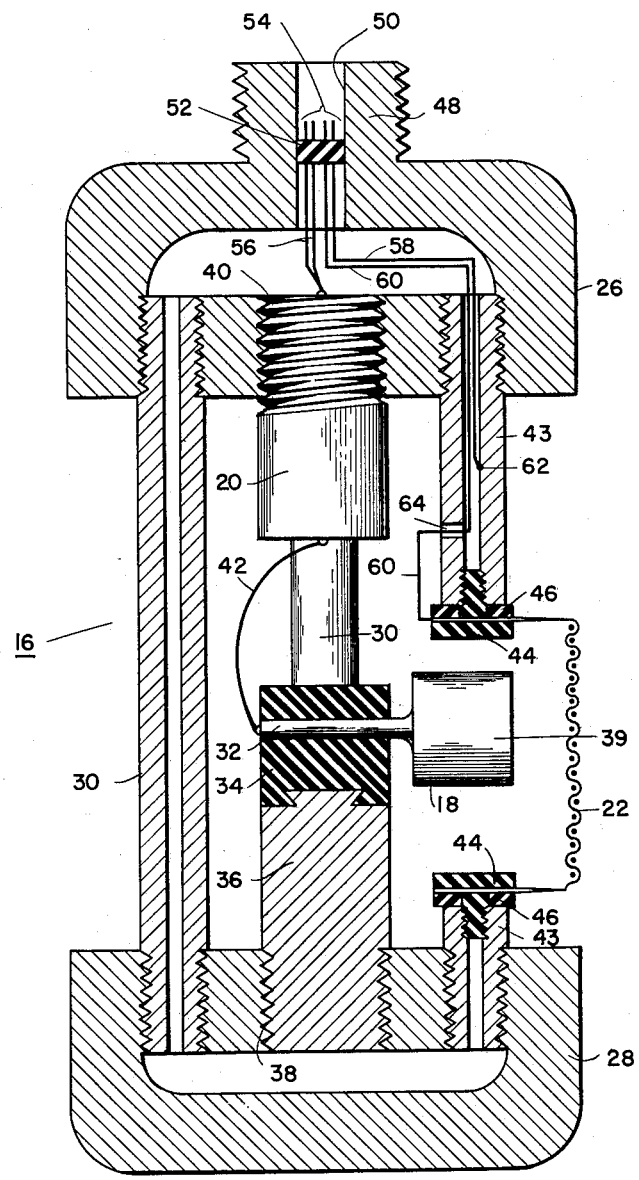
Fig. 2 is a diagrammatic view, partially in cross section, of a preferred embodiment of the underground portion including a source for generating sonic energy and electrodes for measuring electric potentials in a borehole.

As diagrammatically shown in Fig. 2, the housing comprises upper and lower heads 26 and 28 which are rigidly held in an axial spaced relation by a number of hollow metal rods 30, two of which are shown. The sonic generator 18 is carried intermediate the heads 26 and 28 by an insulated conductor stem 32 which extends transversely through a fitting 34 formed of hard rubber or a similar material. The fitting is attached to the upper end of a cylindrical member 36, the lower end of which is threadably received in a central opening 38 of the lower head.

The sonic generator may be of any suitable type such as, for example, a piezo-electric material or a magnetostrictive material having suitable characteristics to produce sound waves of an appropriate frequency and intensity. It has been found that satisfactory results can be obtained by using a sonic generator producing sound waves in the borehole fluid having a frequency of the order of 20,000 vibrations per second or below, and an intensity of at least about 12 watts per square centimeter. However, for the purposes of this invention, the term "sonic energy" refers to acoustic energy having a frequency capable of inducing suitable particle motion such, for example, as a frequency ranging from audible to ultrasonic frequency. In a preferred construction, the sonic generator 18 and the source of oscillations 20 comprise a combination of elements selected and arranged to produce the maximum intensity of sonic energy at the optimum frequency for dispersing the particles of the mud sheath.

As diagrammatically shown in Figs. 1 and 2, an effective surface 39 of the sonic generator is arranged to face the wall of the borehole whereby the sound waves are transmitted through the borehole fluid substantially radially of the housing.

The source of oscillations or oscillator 20 may be disposed at the surface of the ground and electrically connected to the sonic generator 18, or it may be carried in the housing 16. As shown in Fig. 2, the oscillator is threadably held at its upper end in a central opening 40 of the upper head 26 and is electrically connected to the conductor stem 32 by an insulated conductor 42.

The screen electrode 22 is preferably of a type which is transparent to sound, such as a mesh screen. As shown in Fig. 2, the screen is attached to the ends of a pair of axially aligned housing rod sections 43 whereby the body of the screen is disposed outwardly from and extends across the face 39 of the sonic generator. More particularly, the screen is attached to and insulated from the housing 16 and the rod sections 43 by a pair of insulated headed studs 44 each of which extends successively through an aperture in the screen and an insulated washer 46, a dnis threadably received in a respective one of the rod sections.

The upper head 26 is provided with an upwardly extending boss 48 having a central axial bore 50 in which there is arranged an insulated plug 52 carrying a required number of terminals 54. For example, two of the terminals may be electrically connected by insulated conductors 56 to the oscillator 20. Insulated conductors 58 and 60 extend from the other two terminals 54 and into the upper hollow rod section 43 wherein the conductor 58 is electrically connected at 62 to the upper rod section 43 and the housing. The conductor 60 is passed through an opening 64 in the upper rod section and is electrically connected to the metallic screen 22 between the upper stud 44 and washer 46.

The boss is externally threaded to permit the instrument housing 16 to be suitably attached to the end of an insulated electrical cable 66, the conductors of which are electrically connected to the terminals 54. As shown in Fig. 1, the cable 66 is reeved over a calibrated sheave 68 and is wound on or unwound from a suitable powered reel 70. The cable 66 is electrically connected at the surface, by slip rings 72, or other devices well known in the art, to a recorder 74 for recording the signals from the electrodes (the housing 16 and screen electrode 22), and to a suitable power supply 76 for energizing the oscillator 20, the sonic generator 18, the recorder 74 and a depth indicator 78. Preferably, the calibrated sheave 68 is coupled to Selsyn generator 80 which is electrically connected by a cable 82 to the depth indicator 78 which, in turn, is electrically connected to the recorder 74 whereby the depth of the instrument housing 16 may be recorded at any instant together with the signals from the housing 16.

In operation, the housing 16 is lowered into the fluid column 15 in the borehole to the depth of the formation which is to be investigated. The sonic generator is energized and sound waves are transmitted through the borehole fluid and impinge upon or irradiate a portion of the mud sheath which is disposed oppositely of the screen electrode 22, whereby that portion of the mud sheath is dispersed and the permeability is increased to permit migration of fluid from the borehole into the formation at a rate of flow determined by the permeability of the formation. No outside potential is applied to the electrodes (the housing 16 and screen electrode 22) and the electric flow potential which appears in the borehole fluid adjacent the irradiated portion of the mud sheath is detected by the screen electrode. This potential represents the difference in potential between the housing 16 and the fluid in the borehole between the sonic generator 18 and the irradiated portion of the borehole wall. A signal corresponding to said potential is transmitted up the cable 66 and recorder together with the depth of the housing 16 as a measurement of a quantity correlatable with the permeability of the formation. By moving the housing through the borehole, measurements of the permeability of other formations traversed by the borehole can be obtained in a like manner to provide a permeability log of the well.

Under some conditions it may be desirable to remove completely a portion of the mud sheath from the borehole wall aand to determine the rate of mud sheath growth as a measure of formation permeability. The rate of growth varies with the flow of fluid migrating from the borehole into the formation. Since the flow is greater in a more permeable formation, the rate of mud growth is more rapid and thus is a measure of formation permeability. As the mud sheath grows, the flow through it decreases and the rate of growth can be determined by noting the change in electric flow potential of the fluid as previously described. However, at the end of its growth, the mud sheath has a thickness of only about ¼ of an inch and the period for taking measurements may be extremely short where the mud sheath is formed on the face of a highly permeable formation. This difficulty can be overcome by lowering the housing 16 to the proper depth in the borehole and irradiating the portion of the borehole wall from which the mud sheath has been removed to prolong the period during which the signals from housing 16 are recorded during the growth of the mud sheath.

The permeability of the formations 12 may also be determined by irradiating the mud sheath overlying the formations and simultaneously taking measurements relating to the change in pressure of the fluid column in the borehole 10; the change in the flow rate of a fluid migrating from the borehole through the irradiated portion of the borehole wall and into the formations; by measuring the resistivities of the formations; or by taking measurements of other quantities effected by the flow of a fluid into the formation.

It has also been found that the mud sheath can be dispersed and entirely removed from a borehole wall by irradiating it with sonic energy transmitted through a borehole fluid such, for example, as water. Thus, the measurement of electric flow potentials and other quantities can be taken in the manner previously described after the mud sheath has been irradiated and entirely removed from the face of the permeable formations being investigated.

It is understood that the application of sonic energy, as taught by the present invention, may be integrated with various other practices and operations within the scope of the present invention. Determinations of formation permeability or other properties can be made by irradiating a portion of the mud sheath overlying the formation and obtaining a sample of the formation fluid for analysis, or by contacting the irradiated formation with a fluid or known composition and taking measurements relating to the properties of the formation and evidenced by, for example, the chemical reaction of the known fluid with the formation fluids, the fluid flow properties or the penetration behavior of the known fluid, the influence of the known fluid on the resistivity properties of the formation, and the pressure differential between the borehole fluid and the formation fluid.

Also, sonic energy may be used to prepare a well for production by circulating a fluid, for example, water through the well and into contact with the mud sheath while moving a device including a source of sonic energy through the well to irradiate and remove the mud sheath overlying the producing formations. The water may be circulated by any well-known means, for example, by a pump 19 which discharges into a conduit 21 whose lower end 17 is positioned adjacent the bottom of the borehole 10. The inlet of the pump 19 may be connected to any source of water or to the upper region of the borehole in order to supply water to the bottom of the borehole. While a pump is shown other sources of pressurized water could also be used to cause circulation of water through the borehole.

Such a device is diagrammatically illustrated in Fig. 3 of the drawings, and comprises a housing 84 including upper and lower heads 86 which are rigidly held in an axial spaced relation by a pair of rods 88. The housing may be provided with any suitable sonic generator 90, the geometry of which is preferably such that the sound waves are transmitted through the borehole fluid in substantially all radial directions. In the embodiment shown, this is accomplished by providing a reflector member 92 having a conical surface 94 centered below the flat surface 96 of the generator, the shape of the surface 94 being such that it reflects sound waves produced by the generator radially in all directions with respect to the axis of the member 92.

The sonic generator 90 is carried by an insulated conductor stem 98 which extends through a member 100 including a fitting 102 formed of rubber or a similar material. The member 100 is threadably attached to the upper head 86, and the reflector member 92 is similarly attached to the lower head as shown.

The upper head 86 is provided with an externally threaded boss 104 including a central opening in which a connecting plug 106 is arranged, the electrodes 108 being connected to the stem 98 by a pair of insulated conductors 110.

The housing 84 is lowered into the borehole on the end of an insulated electric cable (not shown) which is attached to the boss 104 and the conductors of which are electrically connected to the electrodes 108. The cable may be wound or unwound from a powered reel preferably associated with a calibrated sheave, a Selsyn generator and a depth recorder as shown in Fig. 1. In operation, the cable may be electrically connected at the surface to any suitable power source including an oscillator, or alternatively, the oscillator may be carried by the housing in a manner similar to that illustrated in Fig. 2. It is understood that the devices of Figs. 2 and 3 can be used interchangeably to suit operational needs.

We claim as our invention:

1. A method for determining the permeability of a formation traversed by a fluid filled borehole wherein the face of the formation is covered by a relatively impermeable mud sheath in contact with the borehole fluid, comprising the steps of: dispersing a portion of the mud sheath by irradiating it with sonic energy to permit the fluid in the borehole to flow through the irradiated portion at a rate proportional to the permeability of the formation, and simultaneously measuring a quantity representing the permeability of the formation and effected by the flow of fluid through said portion of the mud sheath and into the formation.

2. A method for determining the permeability of a formation traversed by a fluid filled borehole wherein the face of the formation is covered by a relatively impermeable mud sheath in contact with a column of drilling mud in the borehole, comprising the steps of: removing a portion of the mud sheath from any area of the borehole wall to expose the face of the permeable formation and to permit drilling mud in the borehole to flow into the formation at a rate proportional to the permeability of the formation, irradiating said area of the borehole wall with sonic energy, and measuring the rate of growth of the mud sheath on said area of the borehole wall.

3. A method for determining the permeability of a formation traversed by a borehole filled with drilling mud wherein the face of the formation is covered by a relatively impermeable mud sheath in contact with a column of drilling mud in the borehole, comprising the steps of: removing a portion of the mud sheath from an area of the borehole wall to expose the face of the permeable formation and to permit drilling mud in the borehole to flow into the formation at a rate proportional to the permeability of the formation, irradiating said area of the borehole wall with sonic energy, and simultaneously measuring the electric potential adjacent said irradiated area of the borehole wall.

4. A method for logging the formation traversed by a fluid filled borehole wherein the formation is covered with a relatively impermeable mud cake in contact with the borehole fluid comprising the steps of: circulating a pumpable non-plastering liquid through the borehole and into contact with the mud cake, lowering a device including a source of sonic energy into said borehole, transmitting sound waves from the device through the pumpable non-plastering liquid to irradiate and disperse the mud cake into said non-plastering liquid and logging a characteristic of the formation which had been suppressed by the mud cake.

References Cited in the file of this patent

UNITED STATES PATENTS

| | | |
|---|---|---|
| 2,400,678 | Archie | May 21, 1946 |
| 2,437,456 | Bodine | Mar. 9, 1948 |
| 2,569,625 | Wyllie | Oct. 2, 1951 |
| 2,680,485 | Bodine | June 8, 1954 |